United States Patent [19]

Cumbie

[11] Patent Number: 4,705,287

[45] Date of Patent: Nov. 10, 1987

[54] TRAY SUPPORT FOR WHEELCHAIR

[76] Inventor: Carlyen F. Cumbie, 1169 Cole Dr., Lilburn, Ga. 30247

[21] Appl. No.: 944,575

[22] Filed: Dec. 22, 1986

[51] Int. Cl.$^4$ .............................................. A47B 83/02
[52] U.S. Cl. .............................. 280/289 WC; 211/88; 297/DIG. 4
[58] Field of Search ............... 280/242 WC, 289 WC; 297/DIG. 4; 248/225.1, 235; 211/88, 90

[56] References Cited

U.S. PATENT DOCUMENTS

| | | | |
|---|---|---|---|
| 3,301,406 | 1/1967 | Scott | 211/88 |
| 3,662,982 | 5/1972 | Antonius | 211/88 |
| 4,632,451 | 12/1986 | Lee | 280/289 WC |

Primary Examiner—David M. Mitchell
Assistant Examiner—Donn McGiehan
Attorney, Agent, or Firm—James B. Middleton

[57] ABSTRACT

A tray holder is provided for a wheelchair, whereby the tray holder can be conveniently stowed beneath an arm rest with no tray. The tray holder is carried by an arm pivotally carried from one of the vertical supports of the chair, so the tray holder can be disposed in front of the chair or at the side of the chair. When there is a tray in the tray holder, the tray can be at the front or side in useable condition. In another form of the device, the tray holder is held by the arm rests themselves, and the tray provides the force to maintain engagement with the chair.

4 Claims, 6 Drawing Figures

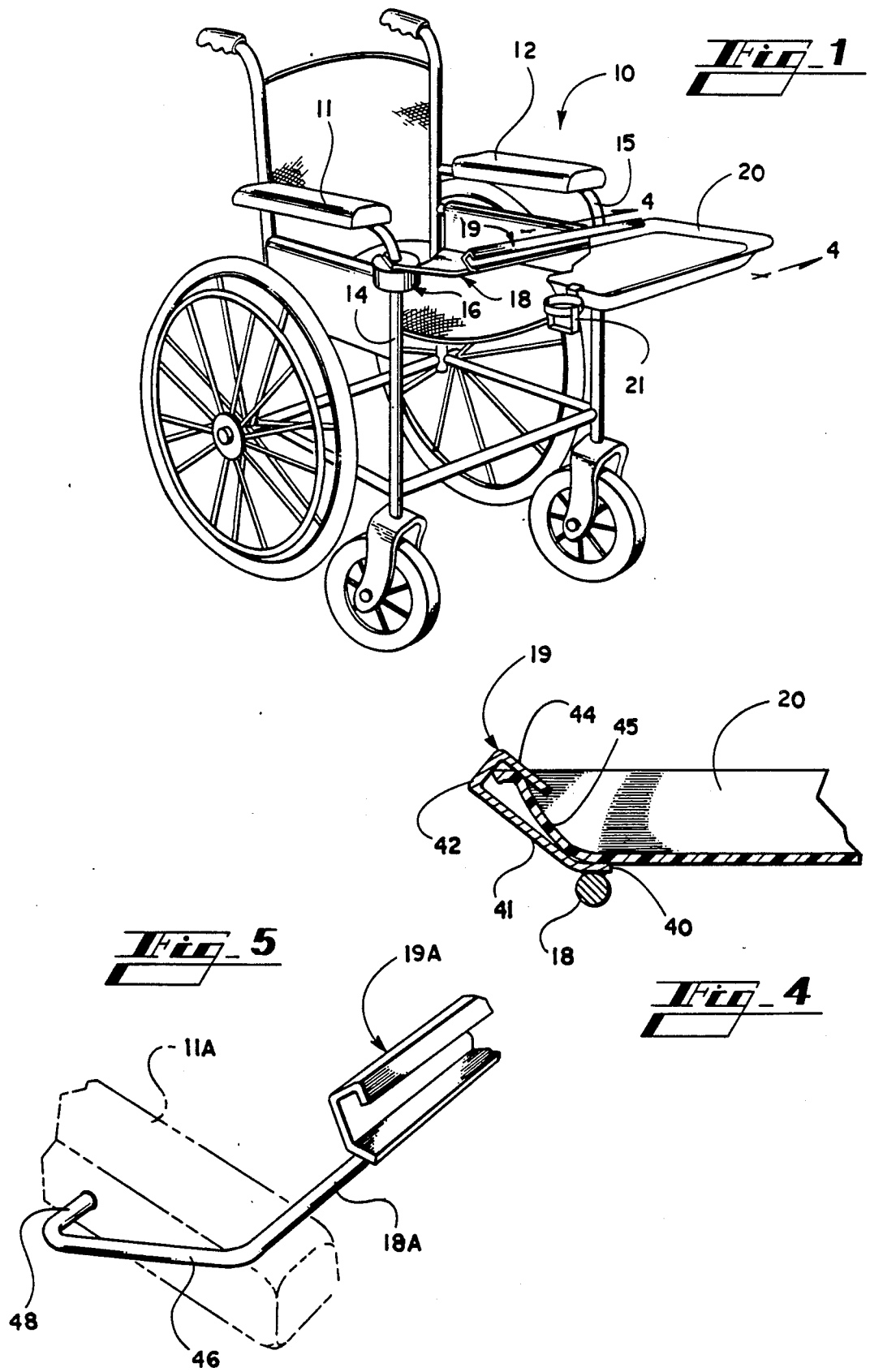

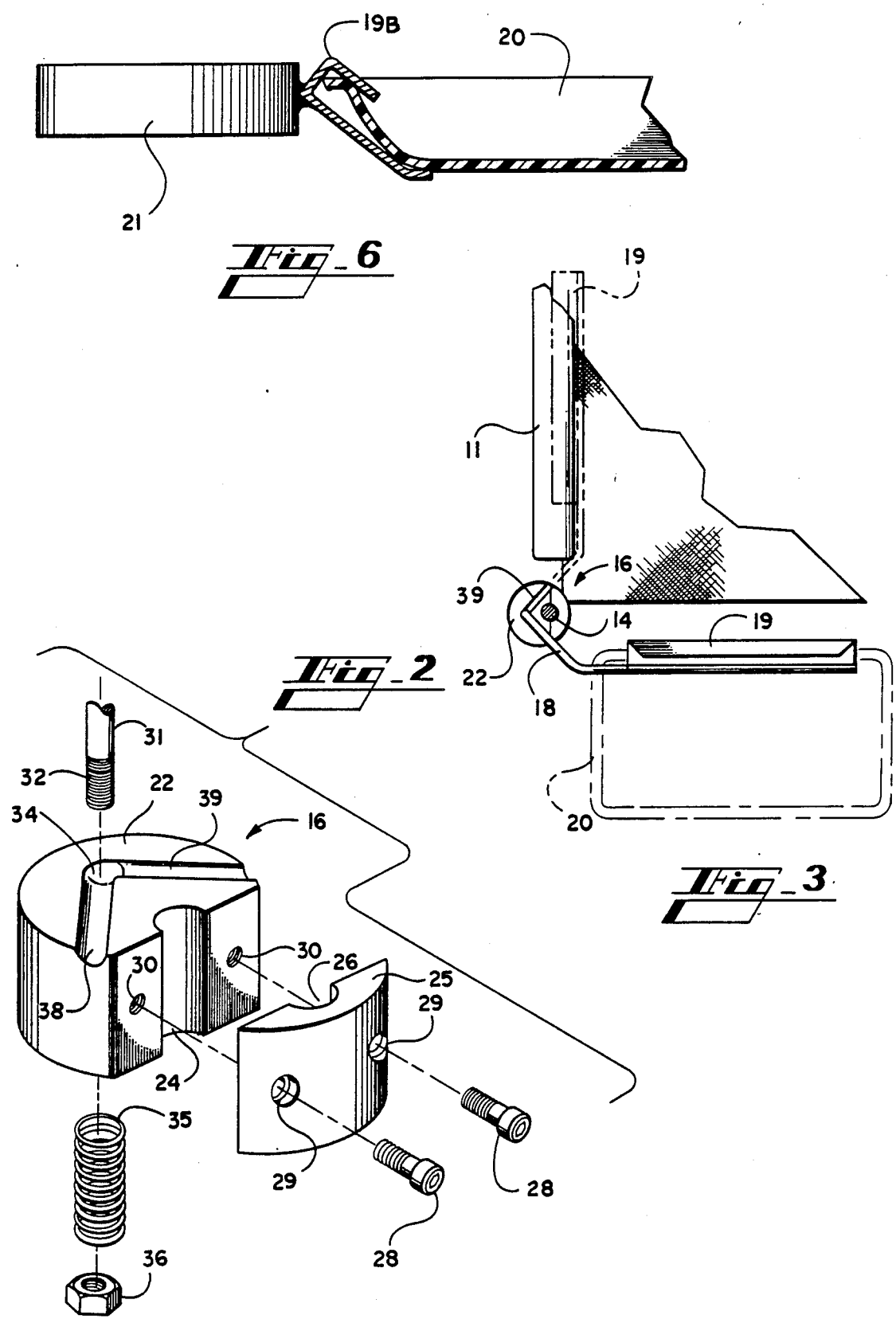

TRAY SUPPORT FOR WHEELCHAIR

INFORMATION DISCLOSURE STATEMENT

With the recent attention to the problem of the handicapped, numerous accessories have been provided for wheelchairs and the like in an effort to make life more convenient and comfortable for those confined to a wheelchair. One of the large problems that has been recognized is that a person in a wheelchair has no place to have things easily at his disposal, such as a table top or the like. Thus, there has been some effort to provide a table, writing desk or similar surface for a wheelchair.

The prior art effort at providing a surface for a wheelchair has been in the direction of placing a large desk or the like on the chair, and arranging the desk to be folded, stowed, or otherwise temporarily moved to a non-use position. While such desks and the like may have their place, such desks tend to be rather large and bulky, and frequently difficult to manipulate, especially for the person in the wheelchair. Furthermore, the desk normally has one useable position so it is placed in front of the person, or not, with no other options.

SUMMARY OF THE INVENTION

This invention relates generally to accessories for wheelchairs, and is more particularly concerned with a tray support for a wheelchair, the tray being easily removeable from the support.

The present invention provides a generally rigid gripping member selectively carried by a wheelchair, the gripping member being arranged to hold a tray or the like in position adjacent to the wheelchair. Thus, the gripping member may be rather permanently carried by the wheelchair, while the tray is easily removeable.

In one embodiment of the invention, the gripping device includes a gripping member that is pivotal with respect to the wheelchair so the tray can be placed at a plurality of positions as desired. In another embodiment of the invention, the entire gripping device is easily removeable from the wheelchair; and, with the gripping device carried by the wheelchair, a tray is easily removeable from the gripping member.

As a further variation of the present invention, the gripping member can be fixed to vessels or holders therefor to allow such vessels to be carried by a tray.

BRIEF DESCRIPTION OF THE DRAWINGS

These and other features and advantages of the present invention will become apparent from consideration of the following specification when taken in conjunction with the accompanying drawings in which:

FIG. 1 is a perspective view illustrating a tray holding device made in accordance with the present invention, carried by a conventional wheelchair;

FIG. 2 is an exploded perspective view showing the attachment means for the device illustrated in FIG. 1;

FIG. 3 is a top plan view of a tray holding device made in accordance with the present invention, with the wheelchair shown fragmentarily and illustrating the alternate position of the tray;

FIG. 4 is an enlarged cross-sectional view taken substantially along the line 4—4 in FIG. 1;

FIG. 5 is a fragmentary perspective view illustrating an alternate embodiment of the tray holder of the present invention; and, FIG. 6 is a view similar to FIG. 4 showing the vessel holding device.

DETAILED DESCRIPTION OF THE EMBODIMENTS

Referring now more particularly to the drawings, and to those embodiments of the invention here presented by way of illustration, FIG. 1 shows a generally conventional wheelchair designated at 10, the wheelchair shown in FIG. 1 including arm rests 11 and 12 carried by support members that extend vertically as at 14 and 15. In the embodiment of the invention illustrated in FIG. 1, it will be seen that the clamping means 16 is carried by the vertical support member 14, and a horizontally extending arm 18 supports the gripping member 19. The gripping member 19 is here illustrated as supporting a tray 20, and the tray 20 carries a vessel supporting means 21, here shown as a holder for a drinking glass or the like.

As illustrated in FIG. 1, it will be seen that the tray 20 is disposed in a position to be generally in front of a person seated in the wheelchair 10, so the tray 20 can act as an eating table, a writing table, a work bench or the like. It will also be understood that the arm 18 is pivotal with respect to the clamping means 16 so that the entire gripping member 19 and tray 20 can be pivoted to be disposed in positions as desired.

For a better understanding of the clamping device 16 attention is directed to FIG. 2 of the drawings. In FIG. 2 it will be seen that the clamping device 16 includes a block 22 having a semi-cylindrical recess 24. A clamp plate 25 has a mating semi-cylindrical recess 26, the recesses 24 and 26 having the same diameter, and being of a diameter such that the device can be securely clamped onto the vertical support member 14 or 15.

To hold the clamp plate 25 in position, there is a pair of screws 28 that pass through appropriate holes 29 in the clamp plate 25, and are threadedly received in holes 30 in the block 22.

The horizontally extending arm 18 illustrated in FIG. 1 terminates in a downwardly turned pintle 31, here shown as including threads 32 at its lower end. The pintle 31 is receivable within a hole 34 through the block 22, the hole 34 being sized to allow easy rotation of the pintle 31 within the hole 34.

To secure the pintle 31 in position, the pintle 31 receives a spring 35 therearound followed by a nut 36. With this arrangement, it will be seen that the pintle 31 can move upwardly, axially, against the tension of the spring 35, but the pintle will always be urged down by the spring 35 acting against the nut 36. Preferably, the hole 34 is enlarged at its lower end to receive the spring 35 and nut 36 therein.

The upper surface of the block 22 defines grooves 38 and 39. Thus, the arm 18 will drop into a groove 38 or 39 when the arm is properly aligned. Once the arm 18 is within a groove, it will be understood that the position of the arm 18, hence the position of the tray 20, is reasonably secure. Nevertheless, the arm 18 can be pivoted through exertion of somewhat more force.

Looking now at FIG. 3 of the drawings, it will be seen that, in plan view, the gripping member 19 can be placed in front of the wheelchair, the arm 18 being received within the groove 38 in the block 22. It will also be note that, due to the placement of the hole 34, the arm 18 extends approximately 45° to avoid the vertical support 14 and extends forwardly; then, the arm 18 bends another 45° to place the gripping member 19 parallel to the front edge of the wheelchair. With the same geometry, the arm 18 can be rotated clockwise as viewed in FIG. 3 until the arm 18 is received within the groove 39 in the block 22.

At this point, the gripping member 19 will be disposed substantially beneath the arm rest 11 of the wheelchair 10. As a result, if the tray is no longer to be used, the tray 20 can be very easily removed from the gripping member 19, and the gripping member 19 is conveniently stowed beneath the arm rest 11. Alternatively, of course, the tray 20 can be held within the gripping member 19, and there is a convenient support means immediately adjacent to the arm rest 11.

While the arrangement here pictured has the clamping device 16 on the right-hand side of the wheelchair, it will be understood that the clamping device 16 could also be placed on the left-hand member 15; and, the arm 18 will angle in the opposite direction to provide a left-handed tray.

In FIG. 4 of the drawings, it will be seen that the tray holding member 19 is designed to receive the upwardly turned edge of a conventional tray 20. The gripping member 19 is preferably formed of sheet metal or the like, the gripping member including a lowermost flange 40 that is fixed to the arm 18. From the lowermost flange 40, the gripping member angles upwardly at 41 to terminate in an end cap 42. A forwardly extending lip 44 completes the device. It will thus be seen that the tray 20 can be tilted upwardly slightly, so the upwardly angled edge 45 of the tray 20 will slide between the angled portion 21 and the lip 44 until the end of the tray strikes the end cap 42 of the gripping member 19. The tray can be lowered to a horizontal position and the lip 44 engages the edge of the tray to prevent further motion. A reverse motion will allow the tray to be easily removed.

Looking briefly at FIG. 5, there is a gripping member designated at 19A carried by an arm designated at 18A. The device shown in FIG. 5 is designed primarily for wheelchairs that do not have the vertical support members such as the members 14 and 15 illustrated in FIG. 1. In this event, the arm 18A can have arm rest engaging portions including the rearwardly extending member 46 terminating in inwardly turned stubs 48. Thus, the arm 18A can be simply slipped over the arm rest 11A of the wheelchair with the arm 18A resting on top of the arm rest and the stub 48 engaging the bottom of the arm rest 11A. A tray held by the gripping member 19A will place a rotational force on the arm 18A so that the stubs 48 will continuously engage the lower surface of the arm rest 11A.

Finally, looking briefly at FIG. 6 of the drawings it will be seen that the vessel holding means 21 is shown fragmentarily, and includes a gripping member 19B fixed thereto, as by welding or the like. It will be understood that the vessel holding means 21 can be virtually any vessel. It is contemplated that the gripping member 19B can be fixed to a bowl used for washing a person in a wheelchair, or to virtually any other vessel. With such an arrangement, when the tray 20 is in place adjacent to a wheelchair, the vessel 21 can be easisly attached to the edge of the tray 20 as is illustrated in FIG. 1.

It will therefore be seen that the present invention provides an extremely simple tray holding device for wheelchairs and the like, and the tray holding device allows easy removal of a tray therefrom. Additionally, with the tray in place, the tray can be rotated with respect to the wheelchair to be placed at the desired position.

It will of course be understood by those skilled in the art that the particular embodiments of the invention here presented are by way of illustration only, and are meant to be in no way restrictive; therefore, numerous changes and modifications may be made, and the full use of equivalents resorted to, without departing from the spirit or scope of the invention as outlined in the appended claims.

I claim:

1. A wheelchair including a seat, a pair of arm rests generally parallel and adjacent to said seat at opposite sides thereof, in combination with a tray support including an arm selectively disposable adjacent to the front edge of said seat of said wheelchair, and a tray gripping member carried by said arm, said tray gripping member comprising a lower flange for receiving the edge of a tray thereon, and a lip partially overlying said lower flange for limiting motion of said edge of said tray, the arrangement being such that said tray is readily received within said tray gripping member and is readily removable therefrom, said wheelchair including at least one generally vertical support for at least one of said arm rests, a clamping device fixed to said vertical support, said arm being pivotally carried by said clamping device, a groove in said clamping device for defining a locked position of said arm so that said gripping member is disposed at the front of said seat of said wheelchair.

2. A wheelchair as claimed in claim 1, said clamping device including a block on one side of said vertical support, and a clamp plate on the opposite side of said support means for fixing said clamp plate to said block for clamping said vertical support therebetween, said block defining a hole therein, said arm having a pintle at one end thereof, said pintle being pivotally receivable within said hole and pivotal therein, said groove extending generally from said hole diagonally towards the front edge of said seat, said arm further including a first portion receivable within said groove and extending diagonally with respect to said wheelchair, and a second portion extending generally parallel to the front edge of said seat.

3. A wheelchair as claimed in claim 2, said block of said clamping device defining a second groove, said first portion of said arm being selectively receivable within said second groove while said second portion of said arm is disposed generally beneath and parallel to one of said arm rests, said gripping member being carried by said second portion of said arm and oriented so that a tray received within said gripping member extends away from the seat of said wheelchair in both positions of said arm.

4. A wheelchair including a seat, a pair of arm rests generally parallel and adjacent to said seat at opposite sides thereof, in combination with a tray support including an arm selectively disposable adjacent to the front edge of said seat of said wheelchair, and a tray gripping member carried by said arm, said tray gripping member comprising a lower flange for receiving the edge of a tray thereon, and a lip partially overlying said lower flange for limiting motion of said edge of said tray, the arrangement being such that said tray is readily received within said tray gripping member and is readily removable therefrom, said arm extending generally across both arm rests, stubs engageable beneath said arm rests, and connecting means fixing said stubs with respect to said arms, said tray gripping member being carried on said arm generally between said arm rests.

* * * * *